United States Patent
Schmieder et al.

(10) Patent No.: US 10,428,854 B2
(45) Date of Patent: Oct. 1, 2019

(54) FASTENING SYSTEM FOR A MACHINE ELEMENT

(71) Applicant: WITTENSTEIN AG, Igersheim (DE)

(72) Inventors: Markus Schmieder, Mühlenbach (DE);
Marco Heckmann, Boxberg (DE);
Jochen Endres, Hemmersheim (DE);
Markus Herrmann, Bad Mergentheim (DE)

(73) Assignee: Wittenstein SE, Igersheim (DE)

( * ) Notice: Subject to any disclaimer, the term of this patent is extended or adjusted under 35 U.S.C. 154(b) by 167 days.

(21) Appl. No.: 15/248,062

(22) Filed: Aug. 26, 2016

(65) Prior Publication Data
US 2017/0058933 A1    Mar. 2, 2017

(30) Foreign Application Priority Data

Aug. 28, 2015   (DE) ........................ 10 2015 114 401

(51) Int. Cl.
| | |
|---|---|
| *F16B 35/06* | (2006.01) |
| *F16B 19/02* | (2006.01) |
| *F16B 5/02* | (2006.01) |

(52) U.S. Cl.
CPC ............... *F16B 19/02* (2013.01); *F16B 5/02* (2013.01); *F16B 5/0225* (2013.01)

(58) Field of Classification Search
USPC ......................................................... 411/398
See application file for complete search history.

(56) References Cited

U.S. PATENT DOCUMENTS

| | | | | |
|---|---|---|---|---|
| 1,097,185 | A * | 5/1914 | Oehrle ................. | F16B 41/002 |
| | | | | 279/6 |
| 3,511,289 | A * | 5/1970 | Coyle ..................... | F16B 2/18 |
| | | | | 411/347 |
| 3,956,803 | A * | 5/1976 | Leitner .................. | F16B 19/02 |
| | | | | 411/349 |
| 4,420,272 | A * | 12/1983 | Ingalls ................... | F16C 23/10 |
| | | | | 280/86.756 |
| 4,696,611 | A * | 9/1987 | Guay ..................... | F16B 19/02 |
| | | | | 411/103 |

(Continued)

FOREIGN PATENT DOCUMENTS

| | | |
|---|---|---|
| CN | 201461611 U | 5/2010 |
| CN | 203114822 U | 8/2013 |

(Continued)

OTHER PUBLICATIONS

European search report for patent application No. 16184999.7 dated Mar. 10, 2017.

(Continued)

*Primary Examiner* — Gary W Estremsky
(74) *Attorney, Agent, or Firm* — Bachman & LaPointe, PC

(57) ABSTRACT

Fastening system for a machine element (41), in particular for an elongate machine element (41), in particular for a toothed rack or a linear guide, for fastening in an abutment (45), in particular a machine bed or a flange, comprising: an eccentric bolt (1) which comprises a pin section (5) to be received in a receiving opening (55) of an abutment (45) and comprises a joining section (7), wherein the joining section is arranged in an eccentric manner in relation to the pin section (5), and an eccentric sleeve (3) to be slid onto the joining section (7).

14 Claims, 3 Drawing Sheets

(56) References Cited

U.S. PATENT DOCUMENTS

| | | | | |
|---|---|---|---|---|
| 5,104,141 | A | * | 4/1992 | Grove .................. B60G 13/006 280/86.753 |
| 5,607,271 | A | * | 3/1997 | Salice ...................... E05D 5/08 411/273 |
| 6,171,195 | B1 | * | 1/2001 | Ferguson ................ B25B 27/16 464/137 |
| 7,374,131 | B2 | * | 5/2008 | Tiid ....................... B64D 9/003 244/118.5 |
| 8,443,514 | B2 | * | 5/2013 | Bertino .................. F01D 9/023 29/888.021 |
| 9,273,712 | B2 | | 3/2016 | Endres et al. |
| 2005/0084361 | A1 | * | 4/2005 | Fly ........................... B25B 5/08 411/107 |
| 2010/0126013 | A1 | | 5/2010 | Bertino |
| 2015/0043990 | A1 | | 2/2015 | Endres et al. |
| 2015/0078892 | A1 | | 3/2015 | Lomas et al. |
| 2015/0176435 | A1 | | 6/2015 | Nagao et al. |

FOREIGN PATENT DOCUMENTS

| | | |
|---|---|---|
| DE | 1178568 B | 9/1964 |
| DE | 1981191 U | 3/1968 |
| DE | 2601388 A1 | 6/1977 |
| DE | 4424151 C1 | 7/1995 |
| DE | 1978265 A1 | 10/2008 |
| DE | 102014101598 A1 | 8/2014 |
| DE | 102013108650 A1 | 2/2015 |
| JP | 60172717 A | 9/1985 |
| JP | 61124716 A | 6/1986 |

OTHER PUBLICATIONS

Chinese office action for patent application No. 201610720791.4 dated Mar. 19, 2019.

* cited by examiner

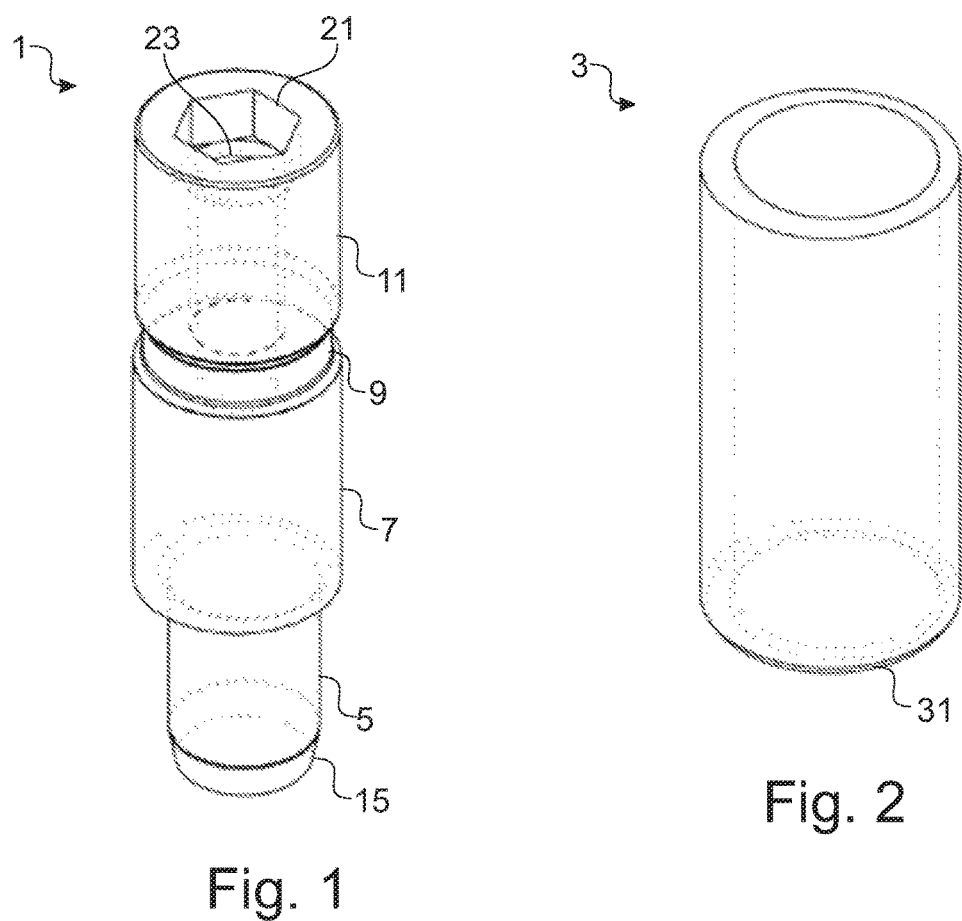

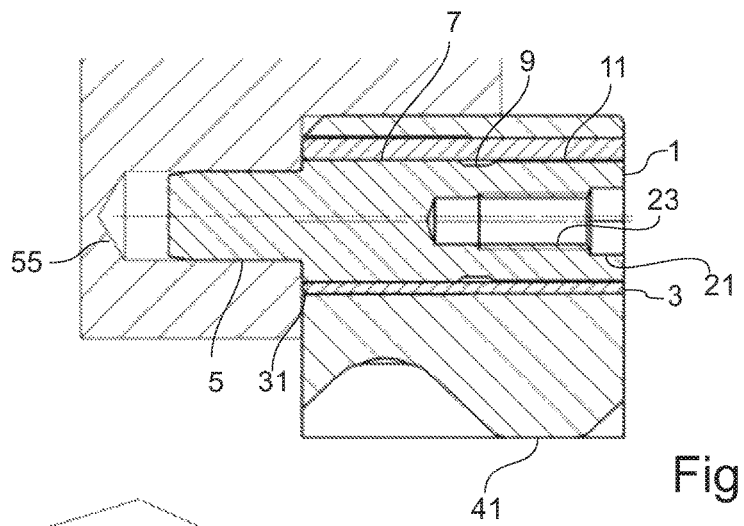
Fig. 5
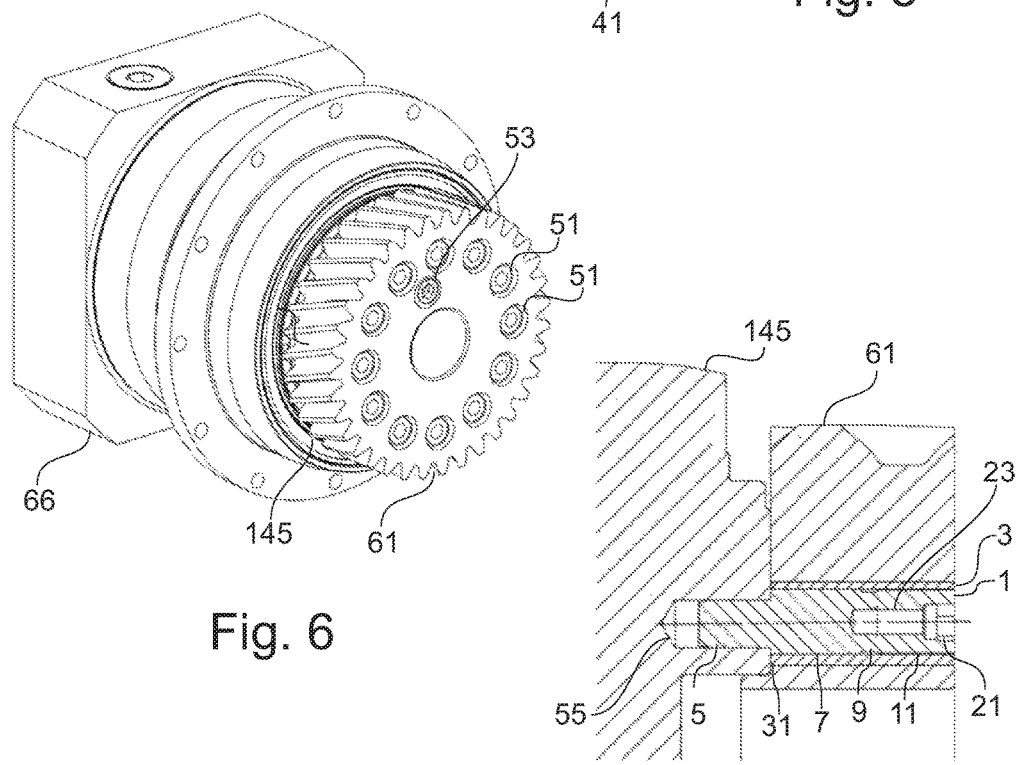
Fig. 6
Fig. 7

FASTENING SYSTEM FOR A MACHINE ELEMENT

BACKGROUND OF THE INVENTION

The invention relates to a fastening system for a machine element, and also to an eccentric, and to a method for fastening a machine element as disclosed herein.

When mounting machine elements, for example toothed racks or linear guides, it is important that the said machine elements are connected to a machine bed in a stationary manner and in a secured position over the entire service life and during operation. The secure connection also has to be ensured when very high forces act on the machine element.

The prior art discloses methods in which a machine element is initially mounted on the machine bed by screws and additionally is fixed to the mating piece by pins. To this end, the machine element has to be drilled and reamed together with the machine bed at several points during mounting, so that the cylindrical, conical, grooved or dowel pins can be joined. Since the machine elements are often constituent parts of large assemblies, machines or installations, they cannot be moved onto stationary machines, which are provided for drilling and reaming, in order to be drilled and reamed. Therefore, drilling and reaming has to be performed by portable machines during mounting. These operations are very time-consuming, inconvenient and cause contamination due to chips.

SUMMARY OF THE INVENTION

The object of the invention is to improve fastening systems for machine elements, which fastening systems are known from the prior art. In particular, a simple design or uncomplicated or rapid or clean mounting should be possible. Furthermore, a high degree of load-bearing capacity is desirable.

The object is achieved by a fastening system for a machine element, and also an eccentric, and a method for fastening a machine element as disclosed herein. Typical developments are also indicated.

A first aspect of the invention relates to a fastening system for a machine element, in particular for an elongate machine element, in particular for a toothed rack or a linear guide, for fastening in an abutment, in particular a machine bed or a flange, comprising: an eccentric bolt which comprises a pin section, which is in particular cylindrical at least in sections, to be received in an abutment and comprises a joining section which is in particular cylindrical at least in sections, wherein the joining section is arranged in an eccentric manner in relation to the pin section, and an eccentric sleeve to be slid onto the joining section.

A further aspect of the invention relates to a fastening system in one of the typical embodiments described in this document comprising an abutment in which receiving openings for receiving the pin sections are provided.

A further aspect of the invention relates to an eccentric bolt for a fastening system in one of the typical embodiments described in this document, which eccentric bolt comprises a pin section, which is cylindrical at least in sections, to be received in an abutment, comprises a joining section, which is cylindrical at least in sections, and comprises a head section, wherein the joining section is arranged in an eccentric manner in relation to the pin section.

A further aspect of the invention relates to a method for fastening a machine element, in particular an elongate machine element, in particular a toothed rack or a linear guide, for fastening in an abutment using a fastening system in one of the typical embodiments described in this document, the said method comprising: fixing the machine element on the abutment, inserting the eccentric bolt into the receiving openings, orienting the eccentric bolt by rotation in the receiving opening in order to allow the eccentric sleeve to be slid onto the head section, orienting the eccentric sleeve, and sliding the eccentric sleeve onto the joining section.

Typical embodiments comprise a head section which is cylindrical in particular at least in sections. The head section is typically concentric in relation to the joining section. In further embodiments, the joining section at the same time forms a head section with the diameter remaining constant. Embodiments can also have shaped sections which are at least partially conical, for example at least one of the pin section, the joining section, an intermediate section or a head section.

In typical embodiments, the head section is of cylindrical design at least in sections. In embodiments, the head section has only partially circular sections along the circumferential direction. Grooves or openings can be provided between the said sections. In further embodiments, the head section, the pin section and/or the joining section each have circumferentially continuous cylinder surfaces over the outer circumference.

Typical embodiments relate to a fastening system for fastening a machine element in a machine bed having an eccentric bolt and an eccentric sleeve. The eccentric bolt is typically subdivided into a plurality of sections. A pin section, which is circular in particular, serves to receive the eccentric bolt in the machine bed. In this case, the diameter of the pin section corresponds approximately to the inside diameter of a receiving opening in the machine bed. The receiving opening and the pin section typically have a transition fit. Typical pin sections have a tolerance of g6 to m6, for example k6. Typical receiving openings have a tolerance of between G7 and K7, for example H7. The fit between the pin section and the receiving opening typically has a maximum excess of +60, typically +30 and/or a maximum play of −40, typically −20. In this case, the values are provided with the unit µm. In exemplary embodiments, the receiving opening and the pin section have a press fit.

The joining section which is arranged eccentrically in relation to the pin typically directly adjoins the pin section of the eccentric bolt. In the exemplary embodiments, the joining section which is arranged eccentrically in relation to the pin directly adjoins the pin section of the eccentric bolt. In embodiments, an intermediate section is further provided between the pin section and the joining section and/or between the joining section and the head section, the said intermediate section having, for example, a smaller diameter than the two adjacent sections or having a diameter which is between the diameters of the adjacent sections.

The casing surface of the joining section typically serves as a joining surface, the inner circumference of the eccentric sleeve bearing directly against the said joining surface. In further embodiments, an intermediate sleeve is further provided.

The head section of the eccentric bolt is typically arranged eccentrically in relation to the pin and concentrically in relation to the joining section. In typical embodiments, the diameter of the head section is smaller than the diameter of the joining section.

Typical eccentric bolts are of integral design. In further embodiments, the eccentric bolt is constructed, for example screwed together, from a plurality of parts.

The head section typically comprises a torque transmission means, for example an internal torque transmission means. Typical torque transmission means are hexagon sockets, slots, cross slots or other structures which enable a tool to be fitted in order to rotate the eccentric bolt about its longitudinal axis. In further embodiments, the torque transmission means is arranged on the outer circumference of the head section or axially adjacent to the head section, for example a square or a hexagon of which the maximum diameter is typically smaller than the diameter of the head section.

The torque transmission means is typically arranged concentrically in relation to the pin section. This enables simple rotation of the eccentric bolt in a receiving opening. In further embodiments, the torque transmission means is not arranged concentrically in relation to the pin section, for example concentrically in relation to the head section or not concentrically in relation to the two said sections.

Typical embodiments of the invention comprise an eccentric sleeve which is distinguished by an inner bore, which is cylindrical at least in sections and has an inside diameter, and an outer surface which is arranged eccentrically in relation to the said inner bore and is cylindrical at least in sections. The eccentricity of the joining section relative to the pin section and the eccentricity of the eccentric sleeve are typically identical. This enables simple adjustment. In further embodiments, the eccentricities are different.

Embodiments of machine elements relate, in particular, to toothed racks or linear guides. Further examples are flanges which can be fastened to other flanges as abutments. In this case, "abutment" can be, but in this case is typically not necessarily, understood to be stationary. By way of example, output shafts or output flanges of motors or gear mechanisms can also form "abutments" to which machine elements can be fastened using typical fastening systems.

Toothed racks are generally produced in a modular manner and mounted in series. Typical toothed racks comprise a plurality of fastening points, such as, for example, bores without or with a step for eccentric bolts and/or fastening openings with a step for receiving screws. Typical bores for receiving the eccentric bolts in the machine element are stepped. Stepped bores are typically made up of a joining part in the lower region in the direction of the receiving bore in the machine bed and an adjoining part which is larger than the joining region. The said two sections are typically approximately of equal length but, in embodiments, can also have different lengths.

The eccentric sleeve is typically suitable for being slid onto, in particular being pressed onto, striking or being pushed onto, the joining section. In this case, "slid onto" typically also includes a process which involves striking or pushing or another application of force. The eccentric sleeve is typically slid onto the joining section by means of the head section. This enables mounting with the eccentric bolt received in the receiving opening in the abutment.

The machine element typically comprises bores for receiving the eccentric bolts and the eccentric sleeves which are arranged on the eccentric bolts. In typical embodiments, the inside diameter of the bore has a transition fit and/or a press fit in relation to the outer circumference of the eccentric sleeve. Typical eccentric sleeves have a tolerance of from g6 to m6, for example of k6, over the outer circumference. Typical bores have a tolerance of between G7 and K7, for example of H7. The fit between the eccentric sleeve and the bore typically has a maximum excess of +60, typically +30, and/or a maximum play of −40, typically −20. In this case, the values are provided with the unit μm.

In typical embodiments, the inside diameter of the eccentric sleeve is formed with a transition fit and/or a press fit in relation to the joining section. Typical joining sections have a tolerance of from g6 to m6, for example j6. Typical eccentric sleeves have a tolerance of between G7 and K7, for example of H7, at the inside diameter. The fit between the joining section and the eccentric sleeve typically has a maximum excess of +60, typically +30, and/or a maximum play of −40, typically −20. In this case, the values are provided with the unit μm. In principle, the information provided in respect of a "maximum" play relates to the absolute value of the associated information, for example an item of information "maximum play" of −40 also includes the value −38.

Typical diameters of the eccentric sleeve, of the joining section, of the pin section, of the receiving bore or of the bore lie between 4 mm and 50 mm.

The abutment typically has circular receiving openings which serve to receive the pin section of the eccentric bolt. The eccentric sleeve is joined between the outer surface of the joining section of the eccentric bolt and a circular bore in the machine element which is to be fastened. The bore in the machine element can also comprise two or more sections of different diameter, wherein the diameter information in relation to the joining section relates to the corresponding section which is level with the joining section in the mounted state.

In typical methods, the machine element is roughly oriented in relation to the abutment and initially fastened, for example, with clamping elements, such as screws or threaded bolts for example. Typical abutments include threaded openings for receiving clamping elements which enable the machine element to be mounted, fixed and/or pre-mounted. The receiving openings in the abutment are typically not arranged coaxially in relation to the bores in the machine element, but rather in an offset manner. In further embodiments, the receiving openings and the bores are coaxial in the mounted state.

The eccentric sleeve is intended to surround the eccentric bolt or to fill the space between the joining section of the eccentric bolt and the corresponding section of the bore in the machine element. This typically results in an interlocking connection between the machine element and the mating piece. In order to be able to insert the eccentric sleeve between the eccentric bolt and the bore in the machine element, it is necessary to orient the eccentric bolt. An adjustment tool which fits the torque transmission means in the head section of the eccentric bolt can be used for this purpose, it being possible to rotate the eccentric bolt into the appropriate angular division in this way.

In typical embodiments, the eccentric bolt comprises an axially running internal thread. Generally, eccentric bolts of typical embodiments comprise an engagement means which allows the eccentric bolt to be removed in its axial direction, for example, from the abutment again. As an alternative to an internal thread, the said engagement means can also be, for example, a groove into which a pin engages. The internal thread can be oriented along the longitudinal axis of the eccentric bolt, that is to say in an axially running manner. In further embodiments, the internal thread is arranged obliquely in relation to the longitudinal axis.

The diameter of the internal thread when the torque transmission means is present is typically smaller than the diameter of the torque transmission means. The internal thread can be formed in the region of the head section, of the joining section or else continuously through the eccentric bolt. In typical embodiments, the internal thread adjoins the torque transmission means. In further embodiments, there is no torque transmission means. In such a case, the internal thread can be set back or begin immediately at the beginning of the head section.

In typical embodiments, the eccentric sleeve is respectively beveled on the inside and/or on the outside at least at one of the two axial ends. In this case, all of the boundary surfaces, or else individual boundary surfaces or a plurality of boundary surfaces, can be beveled on the inside and on the outside at both ends. In further embodiments, for example, at least one of the sections has a bevel, for example the head section or the pin section. Bevels can also be arranged at the transitions in the case of changing diameters or in the case of sections which are arranged eccentrically in relation to one another. Beveled sections, boundary surfaces or boundary ends can make insertion easier. In embodiments, the inner surface of the eccentric sleeve is beveled at both ends in particular. As an alternative or in addition, that end of the joining section which faces the head section is typically beveled. The eccentric sleeve can be pressed into, strike or in general be slid onto the joining section more easily in this way.

In typical embodiments, the eccentric bolt or the abutment comprises a ventilation opening. This prevents resistance to the insertion of the eccentric bolt in the abutment being created by compression of air. In embodiments, the invention provides, for example, the advantage that mounting is made easier and takes place with considerable time savings.

BRIEF DESCRIPTION OF THE DRAWINGS

Further advantages and features of preferred embodiments of the invention will be explained below with reference to the accompanying drawings, wherein:

FIG. 1 shows a schematic perspective view of a typical embodiment of an eccentric bolt according to the invention;

FIG. 2 shows a schematic perspective view of an eccentric sleeve according to typical embodiments;

FIG. 5 shows a schematic view of a section through the machine element and the abutment of FIGS. 3 and 4;

FIG. 6 shows a schematic perspective view of a further typical embodiment; and

FIG. 7 shows a schematic cut-away view of a cross section through a part of the embodiment of FIG. 6.

DETAILED DESCRIPTION

Figure 3:
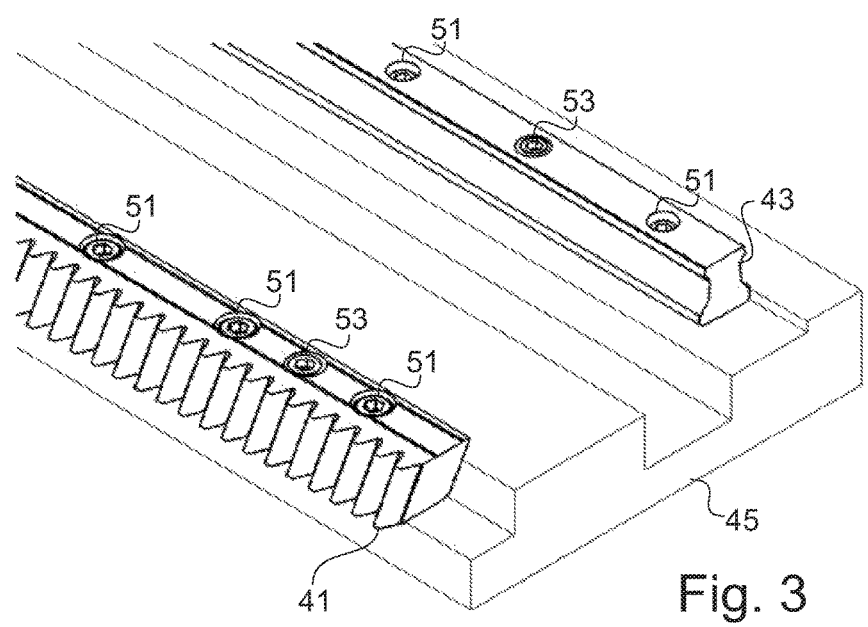
FIG. 3 shows a perspective schematic, partially cut-away view of an abutment together with mounted machine elements.

Typical embodiments will be described below with reference to the figures, wherein the invention is not restricted to the exemplary embodiments; rather, the scope of the invention is determined by the claims. FIGS. 1-7 show typical embodiments or parts of typical embodiments.

FIGS. 1 to 5 will be described in association in the text which follows, wherein each feature or each reference symbol is not explained for each figure individually. Similarly, FIGS. 6 and 7 are described together, wherein features and elements which have already been explained in connection with FIGS. 1 to 5 may not be fully explained once again in connection with FIGS. 6 and 7.

FIG. 1 shows a typical eccentric bolt 1 of embodiments, whereas FIG. 2 shows a typical embodiment of an eccentric sleeve 3. The illustrations in FIGS. 1 and 2 and the illustrations in some of the other figures are drawn to different scales to some extent, but the scales in FIGS. 1 and 2 at least roughly correspond.

The eccentric bolt 1 has different sections, specifically a pin section 5, a joining section 7 which directly adjoins the said pin section, an intermediate section 9 which directly adjoins the said joining section, and a head section 11 which directly adjoins the said intermediate section.

The pin section 5 has a lower beveled edge 15 which makes it easier to insert the eccentric bolt 1 into an abutment. Furthermore, the edges between the further sections, for example respectively between the joining section 7 and the head section 11 on the one hand and the intermediate section 9 which has a smaller diameter, can also be beveled.

All of the sections 5, 7, 9 and 11 are cylindrical at least in sections, with the exception of the conically beveled end pieces, such as the beveled edge 15 of the pin section 5 for example. As in typical embodiments, the sections joining section 7 and intermediate section 9 and head section 11 are concentric in relation to one another and eccentric with respect to the pin section 5.

The diameter of the head section is slightly smaller than the diameter of the joining section 7. In typical embodiments, the diameter of the head section is smaller than the joining section by at least 0.01 mm, typically at least 0.05 mm or at least 0.1 mm and/or at most 3 mm, at most 1 mm or at most 0.5 mm. In embodiments, the reduction in the diameter of the head section relative to the diameter of the joining section is typically at most 5% and/or at least 0.5%

The intermediate section 9 is at least 1%, typically approximately 2 to 20%, smaller in diameter than the joining section 7. The embodiment of FIG. 1 has a bevel at the upper end of the joining section 7, that is to say that end which faces the intermediate section 9.

Embodiments of the invention have a bevel at that end of the joining section which faces the intermediate section or the head section. This bevel can serve to prevent the eccentric sleeve from being blocked at a sharp-edged transition between the joining section and the head section when the said eccentric sleeve is slid on, but rather allows the said eccentric sleeve to be slid onto the joining region without impediment. For reasons of simpler production, further embodiments do not have an intermediate section or a bevel at the described end of the joining section. In embodiments, an intermediate section can make it easier to produce the bevel. Further bevels, specifically at the ends of the head section which can likewise optionally be provided individually or jointly in other embodiments, are provided in the embodiment illustrated in the figures.

The head section 11 of the eccentric bolt 1 of FIG. 1 has a torque transmission means 21 which is designed as a hexagon socket. The eccentric bolt 1 can be rotated about its axis by means of the torque transmission means 21.

An internal thread 23, which is only partially illustrated in FIG. 1 but of which the full length can be seen in section in FIG. 5, is provided so as to directly adjoin the torque transmission means 21 in the eccentric bolt 1 in the axial direction.

At its lower end, the eccentric sleeve 3 of FIG. 2 has a beveled edge 31 which makes it easier to insert the said eccentric sleeve into a machine element or into the intermediate space between the eccentric bolt 1 and a machine element. Otherwise, the eccentric sleeve 3 of the embodiment which is shown in FIGS. 1 to 5 merely comprises a cylinder with a continuously constant diameter and an internal continuous bore.

FIG. 3 shows a first machine element 41, which is designed as a toothed rack, and a second elongate machine element 43, which is designed as a linear guide. The machine elements 41 and 43 are each fastened using screw connections 51 and embodiments of eccentric bolts according to the invention with embodiments of eccentric sleeves according to the invention. The machine elements 41 and 43 are fixedly connected to the abutment 45, which is designed as a machine bed in the embodiment of FIG. 3, with the aid of the said fastenings 53. The screw connections 51 can be screw connections as are known from the prior art. For example, the machine elements 41 and 43 can be pre-mounted in the abutment 45 by means of the screw connections 51.

Some embodiments are used as a fastening system for fastening an elongated machine element like a linear guide or a toothed rack. Further embodiments are used in connection with or as a fastening system for fastening gears, sprockets, pulleys, couplings, wheels, chain wheels, eccentrics, cams, slewing bearings, slewing rings, traction sheaves, fan wheels, flanged shafts, leverages. Further embodiments are used in connection with attachments for housings, such as e.g gearboxes, motor housings (combustion, electrical, hydraulic motors), generator housings, brake housings or pump housings. Further embodiments are used for an attachment of primary and secondary parts in linear motors or for mounting of elevator equipment. Further embodiments are used in connection with the fastening of hydraulic cylinders, flywheels, safety devices, such as end stops, lifting devices or steel constructions.

Figure 4:
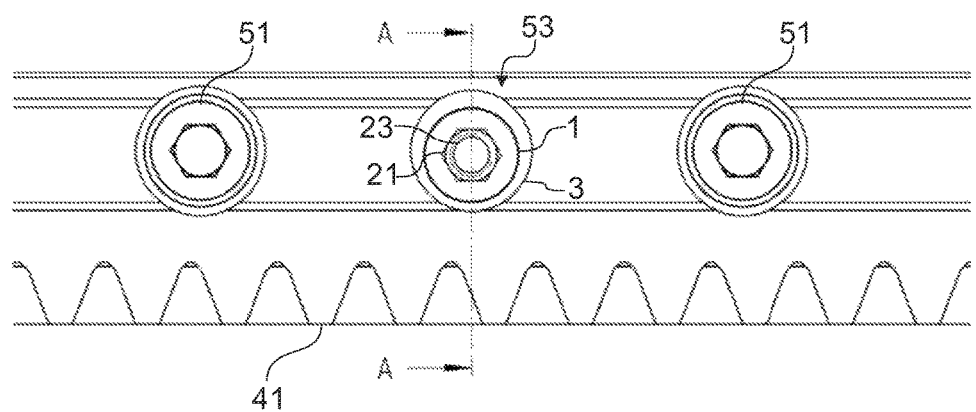
FIG. 4 shows a schematic plan view of a detail of the machine element of FIG. 3.

FIG. 4 shows a plan view of the machine element 41 of FIG. 3, wherein the screw connections 51 and a fastening 53 with an eccentric bolt 1 and with an eccentric sleeve 3 are shown.

FIG. 5 shows a section through the fastening 53 with the eccentric bolt 1 and the eccentric sleeve 3. The eccentricity both of the eccentric bolt 1 and of the eccentric sleeve 3 can be clearly seen in the section. Furthermore, the internal thread 23 can be seen, the said internal thread extending substantially over the head section 11 and the intermediate section 9. The opening for the internal thread 23 is continued further partially into the joining section 7 as a blind hole bore. In further embodiments, there is a continuous bore in which, for example, an internal thread or a torque transmission means can be arranged.

The pin section 5 is concealed in a receiving opening 55 which is designed as a blind hole bore in the machine element 41 here by way of example. In addition, the machine element 41 further has threaded openings for the screws of the screw connections 51 which use screws as clamping elements for mounting or pre-mounting the machine element 41.

When using typical embodiments, as are illustrated in FIGS. 1 to 5 for example, the machine element 41 or 43 is initially oriented roughly in relation to the abutment 45 and fastened using clamping elements such as screws (screw fastenings 51) for example. In embodiments, the receiving openings 55 in the abutment 45 are then generally not oriented coaxially, but rather offset, in relation to the bores in the machine elements 41 or 43. In further embodiments, the bores in the machine elements 41 and 43 are arranged coaxially in relation to the receiving openings 55 in the machine elements 41 or 43. In the case of non-coaxial arrangement, the eccentricities of the bore in relation to the receiving opening 55 can be bridged by at most the sum of the eccentricities of the eccentric bolt 1 and the eccentric sleeve 3.

The eccentric bolt 1 is inserted into the receiving opening 55 in the abutment 41 by way of the pin section 5. The eccentric sleeve 3 is then slid over the head section 11 of the eccentric bolt 1, wherein the eccentric bolt 1 may be oriented by means of the torque transmission means 21 in such a way that insertion of the eccentric sleeve 3 is made easier by way of the beveled edge 31. To this end, it may be necessary to rotate the eccentric sleeve 3 about its longitudinal axis until it is possible to insert or slide the said eccentric sleeve onto the head section 11. After any further fine adjustment of the eccentric bolt 1 relative to the eccentric sleeve 3 and of the said eccentric bolt and eccentric sleeve together relative to the machine element 41, the eccentric sleeve 3 is inserted further, so that it passes over the joining section 7. Pressing, striking or a similar application of force may be necessary for this purpose in order to enable insertion since the corresponding fits are typically transition fits, specifically between the machine element 41 and the outside of the eccentric sleeve 3 and also between the inside of the eccentric sleeve 3 and the outside of the joining section 7. The beveled edge 31 makes the sliding-on or striking or pressing-in operation easier.

When the eccentric sleeve 3 is fully inserted, the length of the said eccentric sleeve typically corresponding to the width or to the thickness of the machine element 41 or to the overall length of the joining section, of the intermediate section if present and of the head section, the eccentric sleeve 3 is fully received between the eccentric bolt 1 and the machine element 41.

Further embodiments include different lengths for the eccentric sleeve with respect to the thickness or the width of the machine element or different lengths with respect to the overall length of the joining section, of the head section plus possibly of the intermediate section.

Embodiments of the invention make subsequent drilling in the case of a pre-mounted toothed rack or in the case of a pre-mounted abutment superfluous since inaccuracies of the receiving opening relative to the bore in the machine element can be compensated for by eccentricities of the eccentric sleeve and of the eccentric bolt. In the process, the invention makes use of the fact that inaccuracies with respect to the position of the receiving openings relative to the bore can be compensated for by two eccentricities which can be added in any desired manner by sliding the sleeve and the bolt one over the other.

FIGS. 6 and 7 show a further exemplary embodiment, wherein an output pinion as machine element 61 is mounted on an output flange as abutment 145. Once again, screw connections 51, which correspond substantially to the screw connections 51 of the exemplary embodiment of FIGS. 1 to 5, and fastenings 53 are provided by means of the eccentric bolt 1 and the eccentric sleeve 3.

Only one fastening 53, which uses the eccentric bolt 1 and the eccentric sleeve 3, is provided in the exemplary embodiment of FIGS. 6 and 7. However, several such fastenings 53 can also be provided in further exemplary embodiments. The machine element 61 as output pinion is a constituent part of a gear mechanism 66 which otherwise can correspond to gear mechanisms from the prior art.

The invention claimed is:

1. Fastening system for a machine element for fastening in an abutment, comprising:
   an eccentric bolt which comprises a pin section, which is cylindrical at least in sections, to be received in a receiving opening of an abutment, and comprises a joining section, which is cylindrical at least in sections, and comprises a head section which is cylindrical at least in sections, wherein the joining section and the head section are concentric and also are arranged in an eccentric manner in relation to the pin section, wherein the head section has a smaller diameter than the joining section, and wherein the joining section is greater in diameter than the pin section and wherein an eccentric step is formed from the pin section to the joining section, and an eccentric sleeve to be slid onto the joining section.

2. Fastening system according to claim 1, wherein the head section is cylindrical at least in sections, and/or wherein the joining section is cylindrical at least in sections.

3. Fastening system according to claim 1, wherein the head section has a torque transmission means.

4. Fastening system according to claim 1, wherein the eccentric bolt comprises an internal thread.

5. Fastening system according to claim 1, wherein the eccentric sleeve is respectively beveled on the inside and/or on the outside at least at one of the two axial ends.

6. Fastening system according to claim 1, comprising an abutment in which a receiving opening for receiving the pin section is provided.

7. Fastening system according to claim 6, wherein the receiving opening and the pin section have a transition fit.

8. Fastening system according to claim 6, wherein the eccentric bolt and/or the abutment comprise/comprises a ventilation opening.

9. Fastening system according to claim 6, wherein the abutment comprises threaded openings for receiving clamping elements for mounting the machine element.

10. Fastening system according to claim 1, wherein the machine element is an elongate machine element.

11. Fastening system according to claim 1, wherein the machine element is a toothed rack or a linear guide.

12. Fastening system according to claim 6, wherein the abutment is a machine bed or a flange.

13. Fastening system for a machine element for fastening in an abutment, comprising:

an eccentric bolt which comprises a pin section to be received in a receiving opening of an abutment and comprises a joining section, wherein the joining section is arranged in an eccentric manner in relation to the pin section, and an eccentric sleeve to be slid onto the joining section, wherein the eccentric bolt comprises a head section, wherein the diameter of the head section of the eccentric bolt is smaller than the diameter of the joining section, and wherein the eccentric bolt comprises an internal thread.

14. Fastening system for a machine element for fastening in an abutment, comprising:

an eccentric bolt which comprises a pin section to be received in a receiving opening of an abutment and comprises a joining section, wherein the joining section is arranged in an eccentric manner in relation to the pin section, and an eccentric sleeve to be slid onto the joining section, wherein the eccentric bolt comprises a head section, wherein the diameter of the head section of the eccentric bolt is smaller than the diameter of the joining section, and wherein the eccentric bolt comprises an internal torque transmission means.

* * * * *